US005565276A

United States Patent [19]

Murakami et al.

[11] Patent Number: 5,565,276

[45] Date of Patent: Oct. 15, 1996

[54] ANTI-FALSIFICATION PAPER

[75] Inventors: Toru Murakami; Yoshiaki Ishii, both of Mishima; Shin-ichi Akahori, Suntou-gun; Kenji Noda, Tagata-gun, all of Japan

[73] Assignee: Tokushu Paper Mfg. Co., Ltd., Japan

[21] Appl. No.: 535,132

[22] Filed: Oct. 11, 1995

[30] Foreign Application Priority Data

| | | | |
|---|---|---|---|
| Apr. 16, 1993 | [JP] | Japan | 5-114009 |
| Aug. 10, 1993 | [JP] | Japan | 5-218161 |
| Sep. 24, 1993 | [JP] | Japan | 5-261769 |
| Nov. 24, 1993 | [JP] | Japan | 5-317396 |
| Feb. 28, 1994 | [JP] | Japan | 6-55105 |

[51] Int. Cl.[6] .................... B32B 29/00

[52] U.S. Cl. .................... 428/537.5; 428/195; 428/207; 428/211; 428/219; 428/323; 428/511; 428/913; 427/331; 427/500; 427/514; 430/10; 162/70

[58] Field of Search .................... 106/401; 430/10; 162/70; 427/331, 500, 514; 428/195, 211, 219, 207, 323, 511, 537.5, 913

[56] References Cited

U.S. PATENT DOCUMENTS

| | | | |
|---|---|---|---|
| 4,428,997 | 1/1984 | Shulman | 428/202 |
| 5,233,360 | 6/1993 | Prengel et al. | 430/39 |
| 5,340,692 | 8/1994 | Vermeulen et al. | 430/233 |

FOREIGN PATENT DOCUMENTS

| | | |
|---|---|---|
| 58-54099 | 3/1983 | Japan . |
| 58-168754 | 11/1983 | Japan . |
| 3-53971 | 3/1991 | Japan . |

*Primary Examiner*—William A. Krynski
*Attorney, Agent, or Firm*—Wenderoth, Lind & Ponack

[57] ABSTRACT

Anti-falsification paper characterized in that thin fragments having brightness, which are obtained by fragmenting nacreous pigment coated paper coated with a nacreous pigment coating solution mainly comprising a nacreous pigment and a binder insoluble in cold water but soluble in hot water, are allowed to exist near the surface of a substrate sheet. Even when falsification is attempted by reproduction using a color copying machine, the colors of the thin fragments having brightness, which are mixed in paper, cannot be reproduced. Therefore, a genuine (original) can be easily distinguished from a forgery (copy). The thin fragments are firmly bonded to paper by the action of the binder, and fall-off of the thin fragments does not occur at the time of printing. Even when anti-falsification paper becomes spoilage or waste paper, thin fragment with brightness does not adversely affect recovery of the pulp.

11 Claims, 2 Drawing Sheets

ANTI-FALSIFICATION PAPER

TECHNICAL FIELD

This invention relates to anti-falsification paper, or reproduction protective paper. More particularly, the present invention relates to anti-falsification paper which makes it possible to easily distinguish an original (genuine) from a copy (forgery) even when falsification is attempted by reproduction using a color copying machine.

BACKGROUND ART

Precision of copying machines has been remarkably improved in recent years, and popularization of electrophotographic color copying machines, in particular, has made it easy to falsify securities and so forth.

To prevent such falsification, various falsification prevention means have been proposed, and one of them utilizes the property of existing copying machines in that they cannot reproduce an original having brightness, such as metallic colors and interference colors.

Japanese Utility Model Laid-Open No. 168754/1988, for example, proposes paper which disposes a bright plate such as an aluminum foil having remarkable metallic colors on the upper surface of a substrate sheet and puts characters and patterns on the surface of the bright plate, and which cannot be reproduced on a copying machine. When this paper is copied, the foil surface becomes dark upon irradiation of light by the copying machine, so that the characters and patterns on the sheet surface cannot be read.

This type of paper has the advantage that reproduction itself is not possible (the resulting copy cannot be read), but is not free from the problem that because the occupying area of the bright plate such as the aluminum foil in the sheet of paper is great, the metallic luster colors are excessively stressed and provide an offensive feel. Further, the production process of paper becomes complicated and the cost of production becomes inevitably higher. Another problem lies in that recovery of paper-making fibers from waste or used paper becomes difficult.

The inventors of the present invention have conducted intensive studies so as to solve these problems and have come to realize that the original and the copy can be distinguished from each other if paper provides a different hue from that of the original even reproduction is made on a color copying machine.

Therefore, the present inventors have first examined a method which fragments a silver aluminum-metalized polyester film having high brightness into thin fragments and incorporates them into paper. When the resulting sheet of paper is reproduced on the color copying machine, the portions where the thin fragments are mixed are merely reproduced in black because the metallic luster cannot be reproduced. Accordingly, the original and the copy can be distinguished, and this type of paper is found to have anti-falsification function.

In the sheet of paper so produced, however, the thin fragments are not firmly bonded to a substrate sheet and it has been found out that fall-off of the thin fragments at the time of printing invites a serious problem. When this paper becomes spoilage or waste paper, removal of the thin fragments consisting of the polyester film is difficult, and recovery of the paper-making fibers is extremely difficult.

DISCLOSURE OF THE INVENTION

It is therefore an object of the present invention to provide anti-falsification paper which has a high bonding strength between thin fragments having brightness and a substrate sheet and does not invite fall-off of the thin fragments at the time of printing even when the thin fragments are mixed in the substrate sheet.

It is another object of the present invention to provide anti-falsification paper which does not offer an incongruous feel to the eye and which permits easy recovery of paper-making fibers even when it becomes spoilage or waste paper.

According to the present invention, there is provided anti-falsification paper wherein thin fragments having brightness, which are obtained by fragmenting nacreous pigment coated paper coated with a coating solution mainly comprising a nacreous pigment and a binder insoluble in cold water but soluble in hot water, are allowed to exist near the surface of a substrate sheet.

BEST MODE FOR CARRYING OUT THE INVENTION

Figure 1:
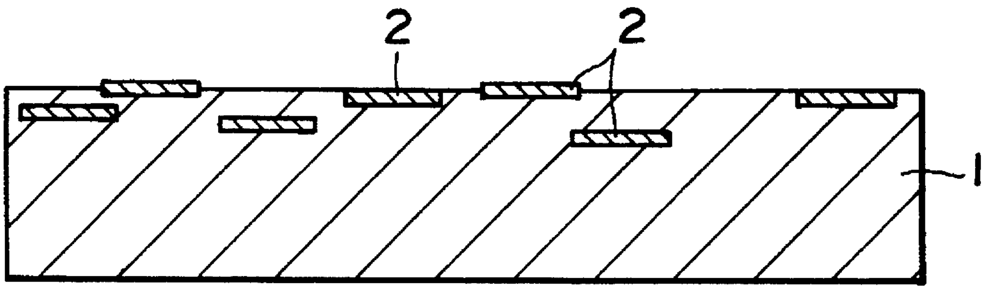
FIG. 1 is a partial enlarged sectional view showing anti-falsification paper according to a fundamental embodiment of the present invention.

FIG. 1 shows a fundamental embodiment of the present invention. Thin fragments 2 comprising nacreous pigment coated paper and having brightness exist near the surface of a substrate sheet 1 of anti-falsification paper. The thin fragments of nacreous pigment coated paper can be allowed to exist near the surface of the substrate sheet by the following method. For example, the thin fragments are dusted onto the web of paper held on a Fourdrinier or cylinder machine so as to bury the thin fragments during the paper-making step of the substrate sheet. In consequence, the thin fragments are exposed to the surface of the substrate sheet or a part of them is buried near the surface of the substrate sheet, so that the thin fragments exist near the surface of the substrate sheet.

After the thin fragments having brightness are so dusted onto the web of paper, the web is dried in a drying zone of a paper-making machine (such as a multiple-cylinder dryer, a yankee dryer, etc) during the paper-making process by imparting heat to it. Since the web contains large quantities of water at the initial stage of drying, hot water comes into contact with the thin fragments, too, and a hot water-soluble binder of the nacreous pigment coated layer undergoes swelling or only its limited part is dissolved and firmly bonds to the substrate sheet. This binder must be insoluble in cold water because if it is dissolved in a wet part (web formation step) of the paper-making machine, the nacreous pigment coated layer is eluted.

Those binders which are insoluble in cold water but are soluble in hot water and are used as a component of the nacreous pigment coating solution, are selected from various water-soluble binders such as a starch type, a methylcellulose type, a carboxylated methyl cellulose type, a hydroxyethylcellulose type, polyvinyl alcohol (hereinafter called "PVA") type, a polyvinyl pyrolidone type, a vinyl ethyl ether-maleic anhydride copolymer type, a polyacrylic acid type, a polyethylene oxide type, etc.

Among them, PVA is used most preferably because it is available relatively economically, has a suitable physical strength and has high transparency. Solubility of PVA in water is greatly affected by the degree of polymerization of PVA and the degree of its saponification, particularly by the latter. For example, PVA having a degree of saponification of not greater than 88% is completely dissolved in water at about 20° C., but PVA having a degree of saponification of 97% and PVA having a degree of full saponification are first dissolved in hot water at about 50° C. and at about 80° C., respectively.

When a binder having a hot water dissolution temperature of less than about 60° C. is used, the binder undergoes excessive swelling or is dissolved in the drying zone of the paper-making process, so that the nacreous pigment coated layer of the thin fragments is more likely to become unable to keep an excellent shape. It is another advantage of anti-falsification paper of the present invention that it can be recovered as spoilage and waste paper, and fibers for paper production can be obtained by treating them by a beater or a pulper. However, when the dissolution temperature of the binder exceeds 80° C., it becomes difficult, and at the same time, dangerous to raise the temperature of the slurry to the dissolution temperature of the binder when spoilage or waste paper is treated to obtain the slurry. Accordingly, the hot water dissolution temperature of the binder used as the component of the nacreous pigment coating solution is preferably from 60° to 80° C.

Because the nacreous pigment coating solution is applied to the thin fragments, the thin fragments exhibit mild brightness of the nacreous pigment, do not generate an incongruous feel even when incorporated into the substrate sheet by the paper-making process, and provide anti-falsification paper having an excellent design property. As the nacreous pigment, known nacreous pigments can be used such as natural pearl essence, mica powder, titanium oxide-coated mica powder, basic carbonates, fish scale foils, and so forth. Technologies described in Japanese Patent Publications Nos. 5367/1960, 28885/1964, 29569/1972, 23179/1973, 47375/1978, 39669/1981, 7674/1983, 22873/1989, 48812/1992, etc, can be used as the production method of these nacreous pigments.

Some of the nacreous pigments exhibit a rainbow color and their hue changes depending on an angle of view. The present invention most preferably uses the nacreous pigments exhibiting this rainbow color because it has an excellent design property and improves the anti-falsification effect. When, for example, thin fragments exhibiting the rainbow colors of green, red and blue are separately produced and anti-falsification paper is produced by using these three kinds of thin fragments, the rainbow colors can be recognized independently for each of these three colors. Accordingly, the design property and the anti-falsification effect can be further improved. When the rainbow color of the nacreous pigment coated layer on one of the surfaces thereof is made different from the rainbow color on the other surface, the trouble of producing separately the thin fragments having different colors can be eliminated advantageously because there is a fifty percent probability that which surfaces of each thin fragment appears on the front side when the thin fragments are dusted onto the substrate sheet.

To produce the nacreous pigment coated paper as the thin fragments, a nacreous pigment coating solution is first prepared by mixing generally 80 to 300 parts by weight (dry weight; hereinafter the term "weight" means the dry weight), preferably 100 to 200 parts by weight, of the binder to 100 parts by weight of the nacreous pigment. Next, this coating solution is applied to both surfaces of base paper having ordinarily a basis weight of 20 to 100 g/m$^2$, preferably 30 to 50 g/m$^2$, in a coating weight of 2 to 10 g/m$^2$, preferably 3 to 5 g/m$^2$, per surface of the base paper. A known application means such as an air knife coater, a roll coater, etc, can be used for coating. A dispersing agent, a antifoaming agent, antiseptics, anti-molds, a viscosity adjusting agent, a colorant, a dye, etc, may be added to the nacreous pigment coating solution, whenever necessary, within the range where these additives do not remove brightness of the nacreous pigment.

Nacreous pigment coated paper obtained in this way is then cut into fragments. Arbitrary shapes such as a circle, an ellipse, a square, a rectangle, a triangle, a pentagon, a star, a crescent, etc, may be selected as the shape of the thin fragments. Arbitrary cutting methods may be employed as the cutting method such as a method which punches out the fragments by using the tooth shape of each of the shapes described above, a method which slits paper into strips by a micro-slitter and further cuts the strips into thin fragments, and so forth. The size of the thin fragments is generally from about 0.2 to about 10 mm.

Base paper of nacreous pigment coated paper comprises mainly a wood pulp such as needle-leaved tree bleached kraft pulp (NBKP) or broad-leaved tree bleached kraft pulp (LBKP), a bast fiber such as paper mulbery or paper bush, or a paper-making pulp such as a cotton pulp or bamboo pulp. Further, a dry paper strength agent such as a polyacrylamide, a wet paper strength agent such as a polyamide-epichlorohydrin resin, a sizing agent such as a rosin, a fixing agent, etc, may be appropriately used in combination. Generally, paper-making is carried out at a freeness of 550 to 250 ml C.S.F. by a known paper-making machine such as Fourdrinier or cylinder machine.

The results of various examinations made by the present inventors have revealed that when a polyolefin type synthetic pulp is blended to a paper stock when base paper of nacreous pigment coated paper is made, life of the punching blade or the cutter blade can be prolonged during the production of the thin fragments. The blending amount of the polyolefin synthetic pulp is preferably 2 to 30 parts by weight to 98 to 70 parts by weight of paper-making pulp.

A fluorescent agent may be blended to base paper of nacreous pigment coating paper during its paper-making process. Alternatively, after the fluorescent agent is added to the nacreous pigment coating solution, the solution may be applied to base paper. Anti-falsification paper, into which the thin fragments containing the fluorescent agent are incorporated in the manner described above, emits fluorescence when ultraviolet rays are irradiated thereto, though fluorescence cannot be observed under an ordinary light source. Accordingly, falsification can be judged more easily.

As the fluorescent agent, fluorescent dyes such as fluorescein, a cumalin type, oxazol type, a pyrazoline type, a thiadiazole type, a spiropyran type, a pyrenesulfonic acid type, a benzoimidazole type, a diaminostilbene type, etc, and inorganic fluorescent agents such as a sulfide type, e.g., zinc sulfide/copper activation pigment, and an oxide type, many be employed.

Brightness of nacreous pigment coated paper can be increased by increasing the mixing ratio of the nacreous pigment in the coating solution. However, the mixing ratio of the binder drops with the increase of the mixing ratio of the nacreous pigment, and not only the strength of the coating layer but also bonding strength to the substrate sheet for anti-falsification paper drop. Accordingly, when the mixing ratio of the nacreous pigment is relatively increased in the nacreous pigment coating solution so as to increase brightness, a transparent coating layer of a binder which is not soluble in cold water but is soluble in hot water is preferably disposed further on the nacreous pigment coated layer. The resulting thin fragments having the two-layered structure of the coating layers become excellent in both brightness and bonding strength. In this case, the coating solution for the first nacreous pigment coated layer preferably comprises 15 to 50 parts by weight of the binder per 85 to 50 parts by weight of the nacreous pigment, for example, and thus the mixing ratio of the nacreous pigment can be relatively increased. A PVA type binder can be used preferably for the coating solution for forming the transparent binder coated layer, and the coating weight is generally from 2 to 10 g/m$^2$ per surface, and both surfaces are coated.

The substrate sheet for anti-falsification paper of the present invention mainly comprises a paper-making pulp such as a needle-leaved tree bleached kraft pulp (NBKP), a broad-leaved tree bleached kraft pulp (LBKP), a needle-leaved tree bleached sulfite pulp (NBSP), a thermomechanical pulp (TMP), etc. Further, a dry paper strength agent, a wet paper strength agent, a sizing agent, a fixing agent, a retention aid, a drainage aid, an antifoaming agent, a dye, a pigment, etc, may be used in combination. Paper-making is carried out generally at a freeness of 550 to 250 ml C.S.F. by using a known paper-making machine such as a Fourdrinier or cylinder machine.

In the present invention, it is further possible to apply starch, PVA, various surface sizing agents, etc, to the web surface during paper-making by a size press, etc.

The following methods can be employed so as to allow the thin fragments having brightness to exist near the surface of the substrate sheet.

1) The thin fragments are dusted onto the web on the Fourdrinier or cylinder machine.

2) Paper stock or water containing the thin fragments are sprayed at a position immediately before or after a slice of the Fourdrinier machine from nozzles at several positions in the transverse direction of the slice.

3) The thin fragments are dusted onto a cylinder of a vat of a cylinder machine.

4) The thin fragments are dusted onto wet web immediately before a press roll.

5) The thin fragments are mixed with the coating solution of the size press, and the resulting mixed coating solution is applied.

After the thin fragments are incorporated in the manner described above, the web is dried by heating in the drying zone of the paper-making machine as previously described, and the hot water-soluble binder contained in the nacreous pigment coated layer of the thin fragments undergoes swelling or its part is dissolved, so that the thin fragments are firmly bonded to the substrate sheet.

To provide surface smoothness, machine calender treatment or super-calender treatment may be appropriately applied to the resulting forgery-preventive paper, whenever necessary.

Figure 2:
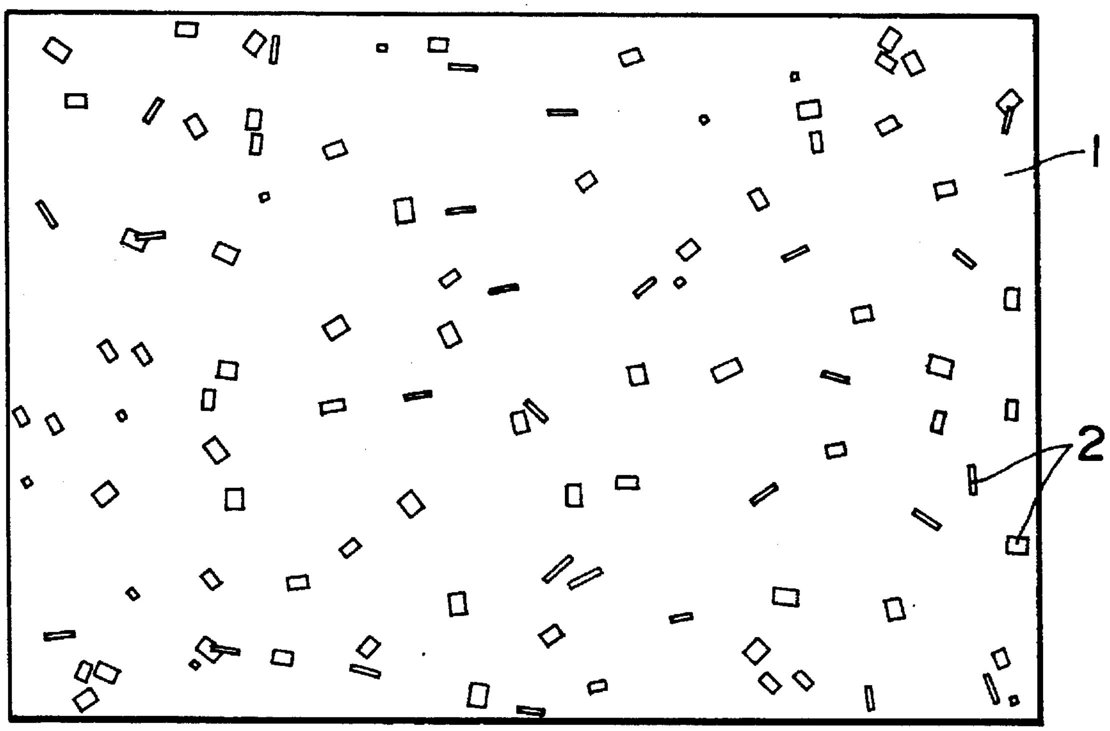
FIG. 2 is a partial plan view showing an example of anti-falsification paper, in which thin fragments having brightness are dispersed substantially uniformly throughout the entire surface, according to the present invention.
Figure 3:
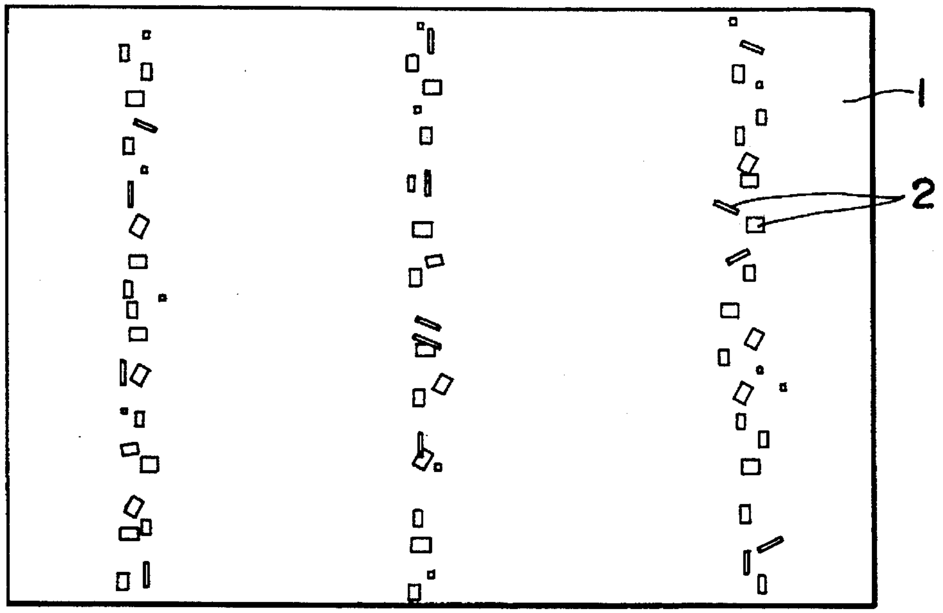
FIG. 3 is a partial plan view showing an example of anti-falsification paper, in which thin fragments having brightness are dispersed in the form of stripes and in a non-uniform arrangement from one another, according to the present invention.

The mode of incorporating the thin fragments into the substrate sheet may be the one that disperses substantially uniformly the thin fragments 2 throughout the entire surface in the proximity of the surface of the substrate sheet 1 as shown in FIG. 2, or the one that allows the thin fragments 2 to exist in the stripe form and in the non-uniform arrangement near the surface of the substrate sheet 1 as shown in FIG. 3. The thin fragments can be uniformly dispersed by, for example, dusting the thin fragments onto the entire surface of the web in the method 1) described above, and can be dispersed in the stripe form and in the non-uniform arrangement by dusting the thin fragments in the stripe form. In the case of anti-falsification paper in which the thin fragments are allowed to exist in the stripe form in the non-uniform arrangement as shown in FIG. 3, the fragment-free portion of the substrate sheet can be utilized preferably as the printing portion.

Figure 4:
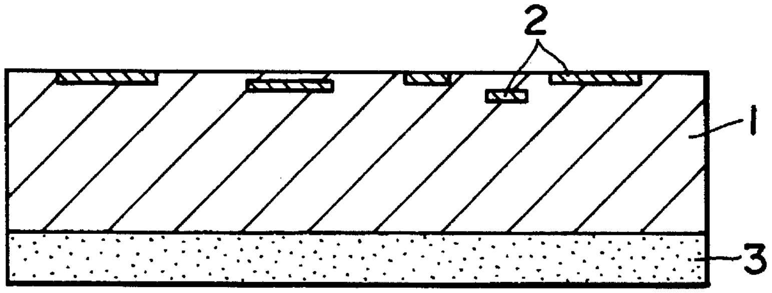
FIG. 4 is a partial enlarged sectional view showing anti-falsification paper, in which thin fragments having brightness are disposed near one of the surfaces of paper and a pigment coated layer having good printability is disposed on the opposite surface, according to an embodiment of the present invention.

When it is desired to obtain anti-falsification paper having particularly excellent printability, the thin fragments 2 having brightness are allowed to exist in the proximity of one of the surfaces of the substrate sheet 1 and the pigment coating layer 3 having good printability is formed on the opposite surface of the substrate sheet 1 as shown in FIG. 4. The pigment coated layer 3 having good printability can be formed by applying a pigment coating solution mainly comprising a white pigment such as kaolin or calcium carbonate and a binder, as has been customary in the field of art paper or coated paper. When printing is made on the entire surface in which the thin fragments are allowed to exist, brightness of the thin fragments drops to a considerable extent and the anti-falsification effect is likely to drop. In the case of anti-falsification paper shown in FIG. 4, however, printing is made on the surface of the pigment coated-layer having good printability, so that the problem of the drop of brightness of the thin fragments due to printing can be solved.

Figure 5:
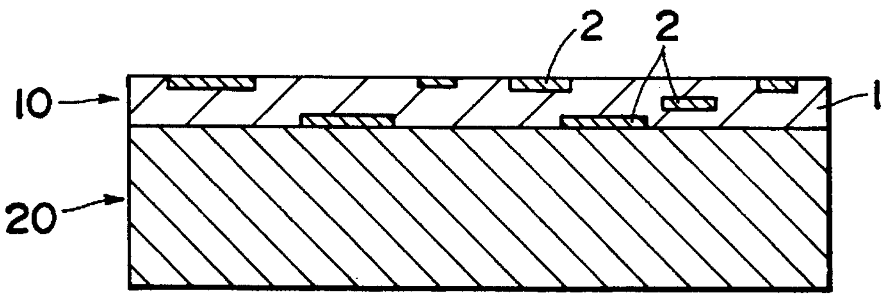
FIG. 5 is a partial enlarged sectional view showing anti-falsification paper, which comprises two-layered combination paper and wherein thin fragments having brightness are contained in the outermost paper layer, according to an embodiment of the present invention.

It may be conceivable to mix in advance the thin fragments having brightness in a paper stock for making the substrate sheet and to make anti-falsification paper by using the paper stock. According to this method, however, a greater proportion of the thin fragments are dispersed more deeply into the substrate sheet and brightness of the thin fragments is not exhibited. However, brightness of the thin fragments mixed in the paper layer is not lost even when paper-making is made by using the paper stock mixed in advance with the thin fragments, if the thickness of the paper layer is reduced. Anti-falsification paper according to another embodiment of the present invention which utilizes this phenomenon is shown in FIG. 5. Anti-falsification paper shown in the drawing comprises two-layered combination paper consisting of a paper layer 10 and a paper layer 20, and can be produced by known paper-making means such as the combination of a tanmo machine and a cylinder machine or the combination of the cylinder machines. The thin fragments 2 of nacreous pigment coated paper are contained in the substrate sheet 1 of the outermost paper layer (the paper layer 10 in the example shown in the drawing), and this paper layer is a relatively thin layer having a basis weight of 20 to 50 g/m$^2$ and preferably 30 to 40 g/m$^2$. Paper-making will become difficult if the basis weight is less than 20 g/m$^2$, and brightness of mixed fragments 2 will be more likely to be lost if the basis weight exceeds 50 g/m$^2$. Though the example shown in FIG. 5 illustrates two-layered combination paper, three- or more layered combination paper may be used, whenever necessary.

Anti-falsification paper according to the present invention can be used in combination with other anti-falsification means, such as watermarking, mixing with dyed fibers, inclusing of security threads, and so forth. The anti-falsification effect can be further improved by so doing.

Hereinafter, the present invention will be further explained with reference to Examples thereof.

EXAMPLE 1

Production of Thin Fragments

A nacreous pigment coating solution consisting of 100 parts by weight of a nacreous pigment of mica powder having a grain size of 40 μm and a titanium oxide coating ratio of 28% and 200 parts by weight of PVA having a hot water dissolution temperature of about 60° C. was applied in a coating weight of 7 g/m$^2$ to each surface of coated paper having a basis weight of 70 g/m$^2$ by using an air knife coater. The resulting nacreous pigment coated paper was cut into rectangles of 1 mm×1.5 mm by a punching machine to produce thin fragments.

Recipe of Substrate Sheet and Its Production 20 parts by weight of NBKP and 80 parts by weight of LBKP were beaten to 350 ml C.S.F., and 10 parts by weight of clay, 0.3 parts by weight of a paper strength agent (trade name "Polystron 191", a product of Arakawa Kagaku Kogyo K.K.), 1.0 part by weight of a sizing agent (trade name "Sizepine E", a product of Arakawa Kagaku Kogyo K.K.) and a suitable amount of alum were added to the beaten pulp to prepare a paper stock.

A substrate sheet having a basis weight of 110 g/m$^2$ was produced from this paper stock using a Fourdrinier machine. The thin fragments obtained in the manner described above were dusted onto the entire surface of the resulting web immediately after a slice in the paper-making process so that the thin fragments were dispersed substantially uniformly. Thereafter, the web was dried by a multiple-cylinder dryer in a conventional manner to produce anti-falsification paper. In the resulting sheet of anti-falsification paper, 1,400 piece of thin fragments on an average per m$^2$ existed near the surface and these fragments were dispersed substantially uniformly.

The existence of the thin fragments in this sheet of paper could not be immediately recognized and only when this paper was inclined at a suitable angle, the rays of light incident into the thin fragments were reflected and entered the eyes and the existence could be first confirmed. The existence of the thin fragments did not provide incongruous feel.

The substrate sheet and the thin fragments were firmly bonded in this paper, and fall-off of the thin fragments was not observed eve when offset printing was conducted.

Copying Test

When anti-falsification paper obtained above was copied on a color copying machine (trade name "Canon PIXEL"), the nacreous color of the thin fragments was not reproduced, and the difference between the original and the copy could be clearly observed with eye.

Pulp Recovery Test 5 parts by weight of anti-falsification paper obtained above, 95 parts by weight of water (that is, a pulp concentration of 5% ) and 0.1 part by weight of caustic soda were fed into a high concentration pulper, and the pulper was rotated while live steam was being blown into it. When the temperature was raised to 60° C., the thin fragments were completely defiberized along with paper. The nacreous pigment was completely dispersed in the finely pulverized pulp. Because the proportion of the nacreous pigment was extremely small, the influences of the mixture of the nacreous pigment could not at all be observed even when paper-making was made by using the resulting recovered pulp.

EXAMPLE 2

Production of Thin Fragments

A nacreous pigment coating solution consisting of 100 parts by weight of a milky nacreous pigment of titanium oxide-coated mica powder (trade name "Iriodin 100", a product of Merck Japan K.K.) and 100 parts by weight of PVA having a hot water dissolution temperature of about 60° C. was applied in a coating weight of 5 g/m$^2$ to each surface of woodfree paper having a basis weight of 35 g/m$^2$ by using an air knife coater. Thin fragments were produced by cutting the resulting nacreous pigment coated paper into rectangles of 1 mm×1.5 mm by a punching machine.

Recipe of Substrate Sheet and Its Production

Anti-falsification paper, wherein the thin fragments were allowed to exist near one of the surfaces of the substrate sheet, was produced by the same recipe and by the same method as those of Example 1. In the resulting sheet of paper, the substrate sheet and the thin fragments were firmly bonded.

Coating with Pigment Coating Solution

A pigment coating solution consisting of 50 parts by weight of kaolin (trade name "UW90", a product of Engelhard K.K.). 50 parts by weight of calcium carbonate (trade name "Tamapearl TP222H", a product of Okutama Kogyo K.K.), 0.25 parts by weight of a dispersant (sodium tripolyphosphate), 6 parts by weight of oxidized starch (a product of Nichiden Kagaku K.K.) and 14 parts by weight of styrene-butadiene copolymer latex (trade name "Nipol LX 407C", a product of Nippon Zeon K.K.) was applied in a coating weight of 15 g/m$^2$ to the surface of anti-falsification paper obtained above opposite to the thin fragment existing surface by using an air knife coater. There was so obtained anti-falsification paper equipped with a pigment coating layer having good printability.

EXAMPLE 3

Production of Thin Fragments

Two kinds of nacreous pigment coating solutions were prepared by replacing the nacreous pigment of the nacreous pigment coating solution of Example 2 with a nacreous pigment exhibiting a red rainbow color (trade name "Mearlin Luster Pigments HI-LITE SUPER-RED 9430Z", a product of MEARL Corporation), and with a nacreous pigment exhibiting a green rainbow color (trade name "Mearlin Luster Pigments HI-LITE SUPER-GREEN 18430Z", a product of MEARL Corporation). Two kinds of nacreous pigment coated paper were produced in the same way as in Example 2 except that each of these coating solutions was separately applied.

Thin fragments were produced by cutting each of the two kinds of nacreous pigment coated paper into circles having a diameter of 2 mm by a punching machine, respectively.

Recipe of Substrate Sheet and Its Production

When a substrate sheet was produced by the same recipe and by the same method as those of Example 1, water containing therein the same amount of the two kinds of round thin fragments was dropped to the surface of the web at positions immediately after the slice from a plurality of pipes disposed at intervals of 100 mm. In anti-falsification paper so obtained, the round thin fragments existed near the surface in the stripe form with the intervals of about 100 mm, the round thin fragments exhibiting two kinds of red and green rainbow colors existed in mixture in each stripe, and they provided excellent design effects. The substrate sheet and the thin fragments were firmly bonded.

Coating with Pigment Coating Solution

Anti-falsification paper was produced by applying the pigment coating solution having the same recipe as that of Example 2 to the surface of anti-falsification paper obtained above opposite to the thin fragment existing surface by the same method as that of Example 2 to dispose a pigment coated layer having good printability, and then carrying out super-calender treatment.

EXAMPLE 4

Production of Thin Fragments 20 parts by weight of NBKP and 80 parts by weight of LBKP were mixed and beaten to 350 ml C.S.F., and 0.3 parts by weight of a paper strength agent (trade name "Polystron 191"), 1.0 part by weight of a sizing agent (trade name "Sizepine E") and a suitable amount of alum were added to the beaten pulp to prepare a paper stock. Paper-making was then made from this paper stock by using a Fourdrinier machine to a basis weight of 35 g/m$^2$ to obtain base paper for nacreous pigment coated paper.

A nacreous pigment coating solution consisting of 85 parts by weight of a nacreous pigment exhibiting a red rainbow color (trade name "Mearlin Luster Pigments HI-LITE SUPER-RED 9430L") and 15 parts by weight of PVA having a hot water dissolution temperature of about 60° C. was applied in a coating weight of 2 g/m$^2$ to each surface of base paper obtained above by using an air knife coater to obtain a nacreous pigment coated layer.

A transparent binder coating solution consisting of a 7 wt % aqueous solution of the same PVA as the one used above was additionally applied in a coating weight of 2 g/m$^2$ to each surface by an air knife coater to form transparent binder coated layers on the nacreous pigment coated layer.

Nacreous pigment coated paper equipped with the nacreous pigment coated layer and the transparent binder coated layer and obtained in the manner described above was cut into rectangles of 3 mm×4 mm by a punching machine to produce thin fragments.

Recipe of Substrate Sheet and Its Production

Anti-falsification paper, wherein the thin fragments were uniformly dispersed near one of the surfaces of the substrate sheet, was produced by the same recipe and by the same method as those of Example 1. The distribution density of the thin fragments was 30 to 40 pieces per 10 cm×10 cm area. The resulting sheet of paper had higher brightness and higher bonding strength of the thin fragments than those of Example 1.

EXAMPLE 5

Production of Thin Fragments

Thin fragments were produced in the same way as in Example 4 except that the nacreous pigment coating solution consisted of 100 parts by weight of a nacreous pigment and 100 parts by weight of PVA, the coating weight of the nacreous pigment coating solution was 5 g/m$^2$ and the coating weight of the transparent binder coating solution was 5 g/m$^2$.

Recipe of Substrate Sheet and Its Production

Anti-falsification paper, wherein the thin fragments were uniformly dispersed near one of the surfaces of the substrate sheet, was produced by the same recipe and by the same method as those of Example 1. The thin fragments in the resulting sheet of paper had higher brightness and higher bonding strength than those of Example 1.

EXAMPLE 6

Production of Thin Fragments

Thin fragments were produced in the same way as in Example 4 except that the pulp for producing the base paper for nacreous pigment coated paper consisted of 19 parts by weight of NBKP, 79 parts by weight of LBKP and 2 parts by weight of a polyolefin type synthetic pulp (trade name "SWP", a product of Mitsui Sekiyu Kagaku Kogyo K.K.), the coating weight of the nacreous pigment coating solution was 5 g/m$^2$ and the coating weight of the transparent binder coating solution was 5 g/m$^2$.

Durability of blades of a guillotine cutter and a punching machine during cutting of the thin fragments could be improved over Examples 4 and 5.

Recipe of Substrate Sheet and Its Production

Anti-falsification paper, wherein the thin fragments were uniformly dispersed near one of the surfaces of the substrate sheet, was produced by the same recipe and by the same method as those of Example 1. Brightness and bonding strength of the thin fragments in the resulting sheet of paper were more excellent than those of Example 1.

EXAMPLE 7

Production of Thin Fragments

Two kinds of nacreous pigment coated paper having the red rainbow color and the green rainbow color, respectively, and obtained in Example 3, were cut into rectangles of 1 mm×1.5 mm by a punching machine, and the thin fragments consisting of the same amount of the red color and the green color in the mixture were produced.

Recipe of Substrate Sheet and Its Production

The recipe of the paper stock for the substrate sheet was the same as that of Example 1. The thin fragments obtained above were mixed in this paper stock, and paper-making was carried out by a two-layered cylinder-cylinder combination machine in a basis weight of 30 g/m$^2$ for the first layer. The thin fragments were not mixed for the second layer, and paper-making was carried out to a basis weight of 80 g/m$^2$. Thereafter, the combination paper-making process was carried out in a customary manner, and the resulting sheet of paper was dried by a multiple-cylinder dryer to produce anti-falsification paper.

In the resulting sheet of anti-falsification paper, 1,500 pieces of thin fragments on an average per 1 m$^2$ were incorporated in the first paper layer (the outermost layer), and brightness of the thin fragments could be clearly recognized from the sheet surface. Since the thin fragments having the red rainbow color and the green rainbow color existed in mixture, the design property was also excellent.

The substrate sheet and the thin fragments were bonded firmly, and fall-off of the thin fragments was not observed even when offset printing was conducted.

Even when each of anti-falsification paper obtained in the foregoing Examples 2 to 7 was reproduced on a copying machine, the nacreous color of the thin fragments could not be reproduced. When the pulp recovery test was conducted, the influences of the mixture of the nacreous pigment were not at all observed, and recovery of the pulp could be made easily.

INDUSTRIAL APPLICABILITY

As described above, anti-falsification paper according to the present invention provides the following effects.

1) When someone attempts to falsify by reproduction using a color copying machine, judgement as to whether it is genuine (original) or a forgery (copy) can be immediately made because the colors of the thin fragments having brightness and incorporated in paper cannot be reproduced.

2) Because the thin fragments exhibit mild brightness due to the nacreous pigment, no incongruous feel is exhibited even when they are incorporated, and the product has excellent design property.

3) The problem of fall-off of the thin fragments at the time of printing does not occur because the thin fragments and paper are firmly bonded.

4) Even when paper becomes a spoilage or waste paper, fibers for paper-making can be easily recovered.

By using the above-described properties, anti-falsification paper according to the present invention can be suitably utilized as anti-falsification paper for checks, stock certificates, debentures, banknotes, gift certificates, passports, various tickets, railroad tickets, etc, and as design paper for posters, pamphlets, greeting cards, envelops; labels, and so forth.

We claim:

1. Anti-falsification paper comprising a substrate sheet containing fragments wherein said fragments having front and rear surfaces and brightness are obtained by fragmenting a paper coated with a solution comprising a nacreous pigment and a binder insoluble in cold water but soluble in hot water, said fragments existing near the surface of said substrate sheet.

2. Anti-falsification paper according to claim 1, wherein a hot water dissolving temperature of said binder is 60° to 80° C.

3. Anti-falsification paper according to claim 1, wherein said fragments having brightness are dispersed throughout a portion near the surface of said substrate sheet.

4. Anti-falsification paper according to claim 1, wherein said fragments having brightness non-uniformly exist in a stripe form near the surface of said substrate sheet.

5. Anti-falsification paper according to claim 1, wherein said fragments having brightness exist near one of the surfaces of said substrate sheet, and a pigment coating layer having good printability is formed on the opposite surface of said substrate sheet.

6. Anti-falsification paper according to claim 1, wherein said fragments having brightness are obtained by fragmenting coated paper formed by further forming a coating layer of a transparent binder, which is insoluble in cold water but is soluble in hot water, on said nacreous pigment coated paper.

7. Anti-falsification paper according to claim 1, wherein said nacreous pigment is a nacreous pigment exhibiting a rainbow color.

8. Anti-falsification paper according to claim 7, wherein said fragments having brightness are a mixture of fragments having mutually different rainbow colors.

9. Anti-falsification paper according to claim 7, wherein said fragments having brightness are fragments having different rainbow colors on the front and rear surfaces thereof.

10. Anti-falsification paper according to claim 1, wherein paper comprising 98 to 70 parts by weight of a paper-making pulp and 2 to 30 parts by weight of a polyolefin synthetic pulp is used as base paper of said nacreous pigment coated paper.

11. Anti-falsification paper wherein said paper comprises two or more paper layers, and the outermost paper layer having a weight of 20 to 50 g/m$^2$ and containing fragments having brightness which are obtained by fragmenting paper coated with a solution comprising a nacreous pigment and a binder insoluble in cold water but soluble in hot water.

* * * * *

UNITED STATES PATENT AND TRADEMARK OFFICE

CERTIFICATE OF CORRECTION

PATENT NO. : 5,565,276

DATED : October 15, 1996

INVENTOR(S) : Toru MURAKAMI et al.

It is certified that error appears in the above-indentified patent and that said Letters Patent is hereby corrected as shown below:

Title page, item [22] should read:--

Item [22], PCT filed: April 14, 1994 ; and insert the following:

Item [86], PCT No.: PCT/JP94/00621

§ 371 Date: October 11, 1995

§ 102(e) Date: October 11, 1995

Item [87], PCT Publication No. WO94/24370

PCT Publication Date: October 27, 1994 --.

Signed and Sealed this

Twenty-first Day of January, 1997

Attest:

Bruce Lehman

BRUCE LEHMAN

*Attesting Officer*

*Commissioner of Patents and Trademarks*